(12) United States Patent
Charpentier

(10) Patent No.: US 6,701,013 B1
(45) Date of Patent: Mar. 2, 2004

(54) SYSTEM FOR RECOGNITION OF HAND-WRITTEN CHARACTERS

(75) Inventor: Didier Charpentier, Aigues-nortes (FR)

(73) Assignee: Itesoett, Aimargues (FR)

( * ) Notice: Subject to any disclaimer, the term of this patent is extended or adjusted under 35 U.S.C. 154(b) by 0 days.

(21) Appl. No.: 09/319,435

(22) PCT Filed: Dec. 3, 1997

(86) PCT No.: PCT/FR97/02184

§ 371 (c)(1),
(2), (4) Date: Oct. 4, 1999

(87) PCT Pub. No.: WO98/25230

PCT Pub. Date: Jun. 11, 1998

(30) Foreign Application Priority Data

Dec. 6, 1996 (FR) .......................................... 96 15243

(51) Int. Cl.⁷ ................................................ G06K 9/34
(52) U.S. Cl. ....................................... 382/175; 382/179
(58) Field of Search ................................ 382/305–306, 382/171, 101–102, 112–113, 173–179, 182–188, 312–321; 358/403, 462, 474, 1.1–1.6, 1.9; 707/500, 504–508, 1–6; 715/541, 505–508

(56) References Cited

U.S. PATENT DOCUMENTS

| | | | | |
|---|---|---|---|---|
| 5,134,669 A | * | 7/1992 | Keogh et al. | ............... 382/318 |
| 5,237,628 A | * | 8/1993 | Levitan | ..................... 382/175 |
| 5,307,423 A | * | 4/1994 | Gupta et al. | ................ 382/182 |
| 5,513,277 A | * | 4/1996 | Huttlenocher | ............... 382/171 |
| 5,581,628 A | * | 12/1996 | Nakamura et al. | .......... 382/101 |

* cited by examiner

Primary Examiner—Leo Boudreau
Assistant Examiner—Ishrat Sherali
(74) Attorney, Agent, or Firm—Young & Thompson

(57) ABSTRACT

A document contains zones in which to write at least one character per zone, and directions as to the information that is required in the zones. The directions are printed in the zones such that the written characters constituting the required information overlap the printed directions.

8 Claims, 2 Drawing Sheets

SYSTEM FOR RECOGNITION OF HAND-WRITTEN CHARACTERS

TECHNICAL FIELD

The present invention relates to the recognition of handwritten characters, and in particular a process and a system for recognizing handwritten characters on documents of the type of forms to be filled in.

STATE OF THE ART

Modern techniques involving computers nowadays permit the automatic reading of handwritten documents under conditions in which the cost is very much greater than the cost of a manual operation.

However, automatic processing of handwritten documents is possible with high efficiency only if documents of the form type are used which have been pre-printed by first filling in boxes which are to be read.

Pre-printing requires the user, or writer, who fills in a document of the form type, to properly position the characters and to write legibly a character in each box. In each of these cases, the writer is asked to write a letter (generally a capital letter), a number or an X.

The written document is then read by an electro-optical detector which generally delivers a signal which can have two levels, a first level corresponding to the shade of the handwritten characters, and a second level corresponding to the color of the paper in the boxes. An image processing means then carries out a recognition of the handwritten characters located in the boxes and causes to correspond to each box a binary series of data according to known techniques.

During processing, it is obviously necessary to separate or eliminate the characters previously printed on the document. Several processes have been used to carry out this elimination, and in particular the use of non-actinic printing. This process however has drawbacks, in particular the requirement of printing the material in at least two colors.

Another process not having these drawbacks is described in French patent application 95 10031. The process described in this patent application consists in using a form containing printed boxes in which are to be handwritten characters adapted to be read by an optical recognition device, the boxes being predefined by predetermined motives constituting elements characterized by at least one parameter verifying a predetermined relationship so as to be able easily to eliminate, during reading of the document, the objects as to which the parameters verify the predetermined relationship as being constituent elements of the predetermined designs.

Although effective, this process requires however that the form comprise on its face or below the boxes to be filled in the nature of the information to be to be written in these boxes, such as "NAME", "GIVEN NAME", "ADDRESS", etc. This printing, which is necessary so that the correct information will be written by the writer in the appropriate boxes, obviously has the principal drawback of occupying a substantial surface of the form and hence wasting paper.

SUMMARY OF THE INVENTION

This is why the principal object of the invention is to provide a system of handwritten character recognition using a form in which no surface is used to write in information relative to the boxes to be filled.

The principal object of the invention is thus a process for handwritten character recognition in a document of the form type containing printed boxes as well as pre-inscribed characters within the boxes in which corresponding characters are to be handwritten according to the indications supplied by the pre-printed characters, the printed boxes and the pre-printed characters being constituted by predetermined elements characterized by at least one parameter verifying a predetermined relationship whilst the predetermined relationship is not verified for the handwritten characters. The process comprises the steps of reading the document by successive elemental zones with the help of a character recognition device, determining that the parameter or parameters characterizing a read object in a set of elemental zones verifies the predetermined relationship, and eliminating the objects for which the predetermined relationship is verified as being predetermined elements.

Another object of the invention is the provision of a document of the form type containing printed boxes in which to handwrite characters adapted to be read by an optical recognition device, the boxes containing pre-printed characters supplying indications to the user to write therein handwritten characters as well as printed boxes that the pre-printed characters are constituted of predetermined elements, characterized by at least one parameter verifying a predetermined relationship whilst the predetermined relationship is not verified for the handwritten characters, so as to be able easily to eliminate, during reading of the document by an optical recognition device, the objects whose parameter or parameters verify the predetermined relationship as being predetermined elements.

BRIEF DESCRIPTION OF THE FIGURES

The aims, objects and characteristics of the invention will become better apparent from a reading of the description which follows, given with reference to the accompanying drawings, in which.

DETAILED DESCRIPTION OF THE PREFERRED EMBODIMENTS

Figure 1:
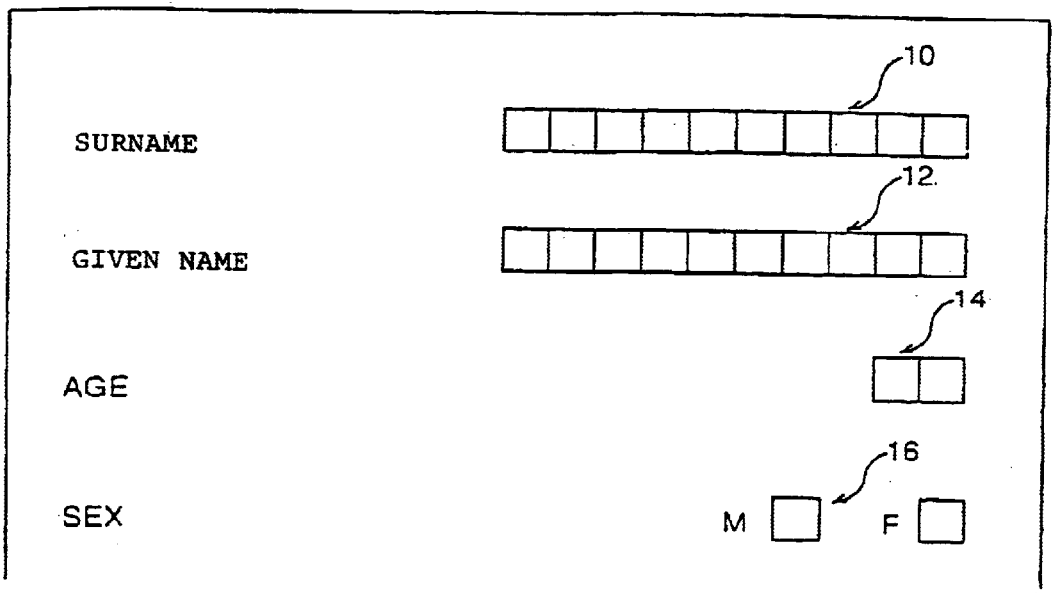
FIG. 1 shows a portion of a form used in the prior art.

A conventional form is generally as shown in FIG. 1. The reader must fill the boxes following the printed directions for each group of boxes. Thus, he must write in his name in the boxes of the first line 10, generally in capital letters, then his given name in the boxes of the second line 12. In the third line 14, he must indicate his age by writing in two digits. In certain lines such as line 16 indicated "SEX", he must place an X in one box, either that designated "M" (for male), or that designated "F" (for female).

As will be seen, it is necessary to provide on this from regions contiguous to the boxes (as in FIG. 1) or below the boxes, to indicate the information to be written into the boxes such as the name, given name, age, sex, etc.

The invention avoids using up a surface of the form to print the directions mentioned above, by using first of all the process forming the object of the patent application 95 10031. In other words, the boxes 10, 12, 14 or 16 are constituted of elements which are characterized by one or parameters verifying a predetermined relationship, such as the size of the elements, their surface, their position, for spacing between two elements or else parameters characteristic of the shape of the elements.

At the time of reading by the character recognition device, the processing carried out consists in eliminating the elements of the design of each box when there is detection of the parameters verifying said predetermined relationship, by recognizing the character located there.

Figure 2:
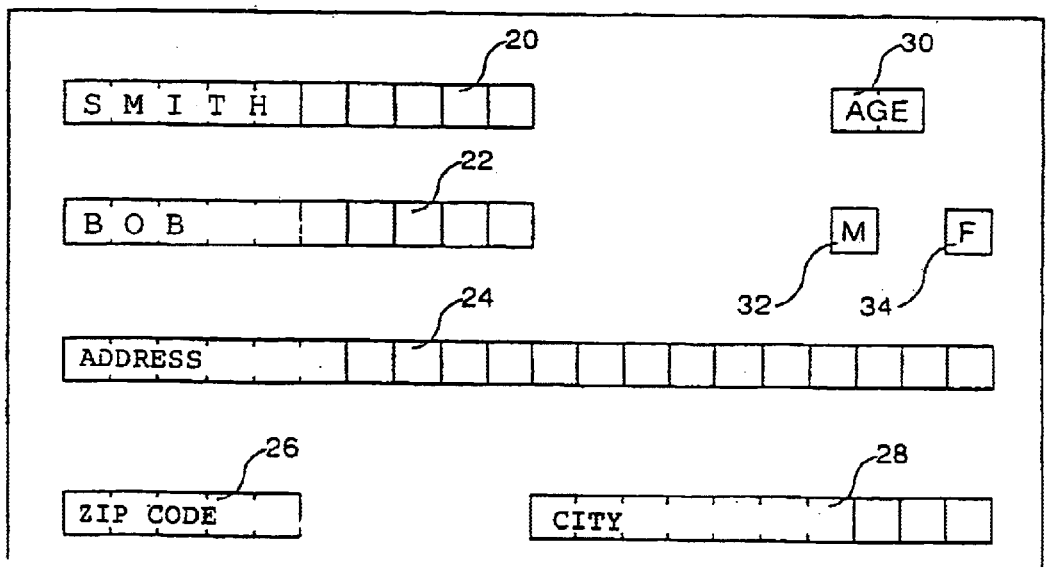
FIG. 2 shows a portion of a form using the principles of the invention.

By using this concept, the invention consists in printing the indications needed to help the writer, directly in the boxes and not facing or below the boxes as was the case previously, and by using the same principals as those described in patent application 95 10031. The indications such as those shown in FIG. 2, occupy a portion of the rows of the boxes in which the writer will write the required information. As is apparent from FIG. 2, the printed indications (e.g., "SURNAME") overlap an imaginary horizontal axis that is positioned at half a height of the row of boxes. Thus, "NAME" is inscribed in the row of boxes 20 in which the surname is to be written, "FIRST NAME" is written in the row 22, "ADDRESS" is written in row 24, "ZIP CODE" is written in row 26, "CITY" is written in row 28 and "AGE" is written in the two boxes 30 adapted to receive the written age of the writer. One of the two boxes 32 and 34 for the sex and comprising respectively "M" (male) and an "F" (female) must be marked with an X.

The directions printed within the boxes are destined, like the boxes themselves, to be eliminated upon reading by the character recognition device.

One embodiment consists in that the boxes and/or the pre-printed characters be formed of elements characterized by one or several parameters verifying a predetermined relationship which is recognized at the time of reading the form.

So that the characters written by the writer will stand out in spite of the existence of pre-printed characters, it is desirable that these latter be of a shade sufficiently light that they appear very little when the boxes are filled in by the writer whilst being readable before filling in. The boxes of the formula and the characters which are pre-printed in them could for example be printed in a light blue shade and could ask that the marking by the writer be performed with a blacking pen.

It should be noted that an embodiment falling within the scope of the invention as has been set forth, is the provision that the pre-printed characters within the boxes and/or the boxes themselves be printed with a non-actinic ink and hence be ignored upon reading by the character recognition device.

Figure 3:
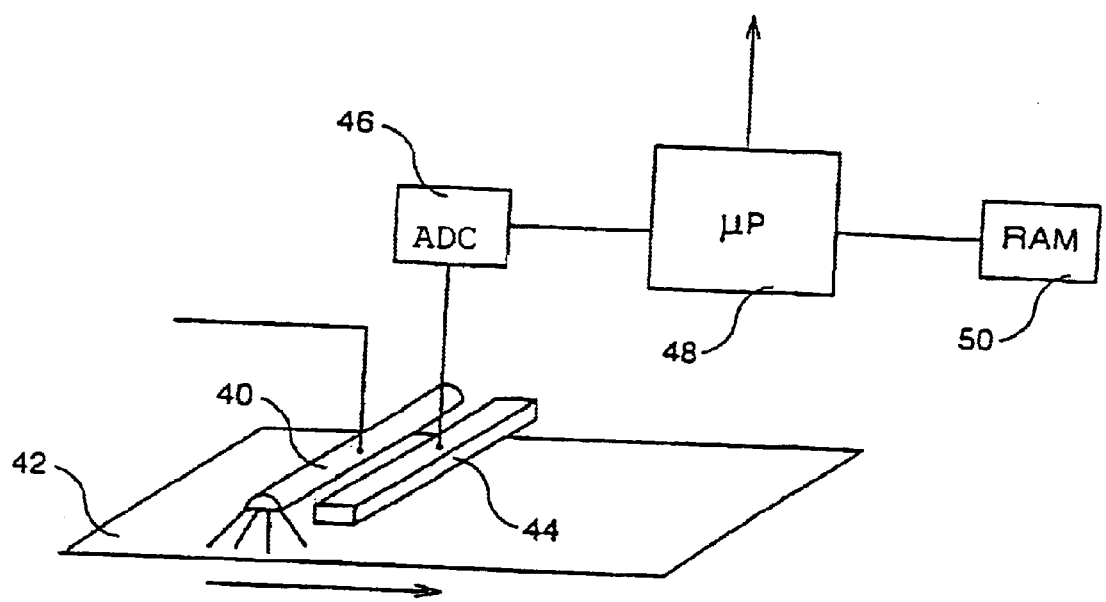
FIG. 3 shows schematically a device for character recognition used for reading the form according to the invention.

A device for optical recognition used in the framework of the invention is shown in FIG. 3. The device has a luminous source 40 supplying to the document 42 a predetermined illumination. Adjacent the luminous source 40 is disposed an electro-optical detector 44 which gathers the light reflected by the document to the extent as it moves in the direction of the arrow. The signals supplied by the detector 44 are then converted into digital signals by the analog-digital converter 46. The resulting digital signals are supplied to a processor (or microprocessor) 48 so as to eliminate the positioning designs, or to store them in a memory 50.

When the process of elimination is carried out by the opto-electrical detector 44, this latter can act in an analogous manner (which is to say in the manner of a photocopier). In this case, the designs to be used for pre-printing of the form and the pre-printed characters within the boxes must be comprised of elements whose one dimension is less than the threshold of resolution of the detector. At the output of the detector, the elements of the design not having been read by the detector because of its low resolution, will have disappeared and the signals supplied will represent only the handwritten characters whose width is generally quite a bit greater than the threshold of resolution of the detector.

The signals can then be converted into digital signals for ultimate processing and character recognition.

The elimination process can be done directly by the electronic detector of the character recognition device when the detector has a low resolution, or subsequent to the image detection, by means of digital processing when the detector has a high resolution.

Thus, there can be used simple software when the designs of the boxes and the pre-printed characters in the boxes are constituted of simple elements, for example thin vertical or oblique lines.

Subsequent treatment, carried out by the processor 48 of the recognition device, then uses software for which the series of bits in which the first and the fourth bits are zero, in particularly the sequence 0110 corresponding to the elements of the design, are replaced by other 0 bit sequences. The elements of the printed design and the pre-printed characters in the boxes will thus be eliminated. Conversely, the series comprising at least three consecutive 1 bits of the type 01110 corresponding to the image of a stroke of a written character, will not be eliminated. Such processing permits the elimination of designs whose elements are characterized by their shape, referring with reference to a matrix as explained in patent application 95.10031.

It should be noted that, although in the above example the reference matrix does not take account of more than one element, it can be arranged to use a reference matrix taking account of two or several elements constituting the designs and the pre-printed characters without departing from the scope of the invention.

What is claimed is:

1. A process for the recognition of written characters inscribed in zones of a document, each zone having a zone height, the process comprising the steps of:

reading, on the document, inscribed characters written in at least one of said zones and superposed on printed directions that overlap a horizontal axis positioned at half the zone height;

detecting at least one elimination parameter characterizing the printed directions; and eliminating the printed directions based on said at least one elimination parameter.

2. The process of claim 1, in which said elimination parameter comprises a predetermined shape, wherein the step of detecting comprises comparing the light reflected by an assembly of elemental zones of the document with a reference matrix whose elements correspond respectively to elemental zones of the printed directions, so as to eliminate, during the eliminating step, the objects entirely contained in the reference matrix, and save only the other objects as being portions of written characters.

3. The process of claim 1, wherein the step of reading comprises using non-actinic light.

4. The process of claim 1, wherein the step of reading inscribed characters comprises reading directions constituted by elements having at least one parameter verifying a predetermined relationship whereas said predetermined relationship is not verified for written characters.

5. A process for printing a document comprising the steps of:

providing zones in which to write at least one character per zone; and printing, in at least one of said zones, at least one pre-inscribed character supplying printed directions as to which characters to write in said zones, wherein the printed directions overlap a horizontal axis positioned at half a height of said zones so that at least one written character to be inscribed in said zones overlaps said pre-inscribed character, wherein each written character is constituted by elements having at least one elimination parameter permitting elimination of the pre-inscribed character during reading of the document by an optical recognition device.

6. The process of claim 5, wherein the printing step comprises using non-actinic ink.

7. The process of claim 5, wherein the printing step comprises printing directions having half the height of the zones which contain them.

8. The process of claim 5, wherein the printing step comprises printing directions constituted by elements having at least one parameter verifying a predetermined relationship whereas said predetermined relationship is not verified for written characters.

* * * * *